UNITED STATES PATENT OFFICE 2,671,101

ORGANOETHYNYL HYDROLYZABLE ORGANOSILANES

Kurt C. Frisch, Pittsfield, Mass., and Robert B. Young, Schenectady, N. Y., assignors to General Electric Company, a corporation of New York No Drawing. Application March 15, 1952,
Serial No. 276,874

9 Claims. (Cl. 260—448.2)

This invention is concerned with novel silicon compositions. More particularly the invention relates to compositions of matter corresponding to the general formula I
$$R-C\equiv C-\underset{X}{\overset{R_1}{Si}}-X$$

where R and $R_1$ are monovalent hydrocarbon radicals, and X is a hydrolyzable group selected from the class consisting of halogens, acyloxy, and alkoxy groups.

Among the values which R and $R_1$ may be are, for instance, aliphatic, including lower alkyl radicals (e. g., methyl, ethyl, propyl, isopropyl, butyl, hexyl, dodecyl, etc.), and unsaturated aliphatic radicals (e. g., vinyl, allyl, methallyl, etc.), as well as cycloaliphatic radicals (e. g., cyclopentyl, cyclopentenyl, cyclohexyl, etc.); aryl radicals (e. g., phenyl, diphenyl, naphthyl, etc.); alkaryl radicals (e. g., tolyl, xylyl, ethylphenyl, etc.); aralkyl radicals (e. g., benzyl, phenylethyl, phenylbutyl, etc.); and their homologues. It will, of course, be understood by those skilled in the art that R and $R_1$ may represent the same or different monovalent hydrocarbon radicals of the class described above.

Among the halogens which X may be are, for instance, chlorine, bromine, fluorine, etc. The acyloxy radicals which X may represent may be considered as having the structure II
$$-O-\underset{}{\overset{O}{\overset{\|}{C}}}-Z$$

where Z is preferably a lower alkyl radical, for instance, methyl, ethyl, propyl, isopropyl, butyl, etc., radicals. If desired, Z may be any one of the monovalent hydrocarbon radicals for which R and $R_1$ stand. Among the alkoxy radicals which X may be are, for instance, methoxy, ethoxy, propoxy, isopropoxy, etc., radicals; generally, the alkyl group in the alkoxy radical is preferably a lower alkyl group.

The above-mentioned acetylenic silicon compositions may be prepared in various ways. Referring specifically to the preparation of compounds defined by Formula I where X is a halogen, one method for preparing such compositions which has been found particularly effective is to effect reaction between a Grignard reagent corresponding to the general formula III $\qquad R-C\equiv C-MgBr$ and an organohalogenosilane of the formula IV $\qquad R_1Si(X)_3$ where $R_1$ has the meaning given above and X is a halogen, preferably chlorine. The reaction whereby compositions corresponding to Formula I, where X is a halogen, may be prepared can be considered as formed according to the following equation:

V
$$R-C\equiv C-MgBr + R_1SiX_3 \longrightarrow MgBrX + R-C\equiv C-\underset{X}{\overset{R_1}{Si}}-X$$

where R, $R_1$ have the meanings given above and X is a halogen.

Generally, for each mol of the organoethynyl magnesium halide used, we may employ at least one and preferably an excess, for example, from about 2 to 4 or more mols, of the monoorganotrihalogenosilane, where the reaction is preferably carried out in the presence of a catalyst. A catalyst which has been found eminently suitable for the purpose comprises small amounts of powdered cuprous chloride which is added to the ether solution of the organoethynyl magnesium halide, for example, the organoethynyl magnesium bromide.

Thereafter the monoorganotrihalogenosilane is added to the ether solution and preferably stirred at room temperature for several hours, then heated for a period of time ranging from about 2 to 6 hours at the reflux temperature of the mass. The precipitate thus obtained is advantageously filtered from the salts formed, washed several times with organic solvents, e. g., diethyl ether, and the filtrate and washings fractionally distilled to give the desired product.

The organoethynyl magnesium halide, for example, the organoethynyl magnesium bromide, may be prepared by reacting ethyl magnesium bromide with a substantially anhydrous acetylene derivative having the formula $$R-C\equiv CH$$

where R has the meaning given above for the necessary period of time. As is known to persons skilled in the art, the ethynyl magnesium bromide may be prepared by reacting magnesium turnings in a large excess of ether with ethyl bromide.

The preparation of compounds corresponding to the formula $$R-C\equiv C-\underset{X}{\overset{R_1}{Si}}-X$$

where X is either the acyloxy or alkoxy radical is carried out by using as one of the reactants the organoethynyl halogenosilanes of the formula

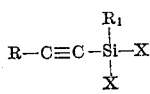

where X is a halogen. Thus, referring specifically to the preparation of the acyloxy derivative, one effects reaction between the organoethynyl halogenosilane described above and an acid or preferably an acid anhydride, for instance, acetic acid, acetic anhydride, propionic anhydride, butyric anhydride, etc. If one employs, for example, acetic anhydride, the compounds obtained thereby will have the following general formula:

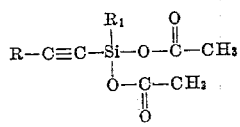

where R and $R_1$ have the meanings assigned above. In reacting the organoethynyl halogenosilane described above with the acid anhydride, essentially equivalent molar amounts are advantageously employed. Obviously, excesses of the acid anhydride may be employed, for example, molar amounts ranging from about 2 to 4 or more mols of the acid anhydride for each mol of organoethynyl halogenosilane may be used without departing from the scope of the present invention. We have found that the presence of a small amount of a catalyst such as, for example, a solution of triethanolamine in the acid anhydride, markedly increases the rate of reaction and also gives a better yield of the acyloxy derivative. Generally, it is desirable to reflux the mixture of ingredients for a time ranging from about 1 to 4 hours, removing the low boiling material which may be present, and thereafter fractionally distilling the remainder of the reaction product to obtain the desired composition, namely, the organoethynyl acyloxysilane.

The organoethynyl halogenosilanes corresponding to Formula I can also be used in preparing the organoethynyl alkoxysilanes of the same formula where X is an alkoxy group. One method which can be employed with advantage is to effect reaction between the organoethynyl halogenosilane with a lower saturated aliphatic alcohol, for example, ethyl alcohol, propyl alcohol, isopropyl, butyl, etc., alcohols. Generally, mere refluxing of the organoethynyl halogenosilane with the lower saturated aliphatic alcohol (advantageously in the presence of a hydrohalide acceptor, e. g., a tertiary amine such as pyridine) preferably in a molar amount equal to at least 2 mols of the alcohol per mol of halogenosilane are employed in order to give good yields of the organoethynyl alkoxysilanes, that is, compounds corresponding to general Formula I, where X is an alkoxy radical and preferably is the same.

In order that those skilled in the art may better understand how the present invention may be practiced, the following examples are given by way of illustration and not by way of limitation. All parts are by weight.

Example 1

Ethyl magnesium bromide was prepared by adding 96.8 grams of magnesium turnings to 400 cc. ether and thereafter adding 436 grams ethyl bromide and 1200 cc. ether. This mixture was stirred thoroughly until it was evident that complete reaction had taken place to form the ethyl magnesium bromide Grignard reagent. This preparation of the Grignard reagent is well known to persons skilled in the art and requires no further detail. Thereafter, a solution of 50 grams of 1-pentyne in 50 cc. ether was added gradually to the equivalent amount of ether solution of ethyl magnesium bromide. After the addition was completed, which took about an hour, the mixture was refluxed at the reflux temperature of the mass for 2 hours. To the ether solution of 1-pentynyl magnesium bromide was added 1.5 grams of cuprous chloride. This Grignard solution was then added slowly with stirring to 330 grams of methyl trichlorosilane (excess), maintaining general refluxing. The mixture was then refluxed for an additional two hours and thereafter cooled. The white precipitate which formed was filtered off and washed several times with diethyl ether. The washings and filtrate were combined and the solvent and excess methyl trichlorosilane were removed by distillation, and the residual liquid product was subjected to fractional distillation. As a result thereof there was obtained in a 52% yield a colorless liquid which distilled at about 168–169° C. at atmospheric pressure. This material was identified as 1-pentynylmethyldichlorosilane having the formula

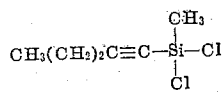

by the fact that analysis for silicon showed it to contain 14.93% as compared to the theoretical amount of silicon present in such compound equal to about 15.47%.

Example 2

The compound 1-hexynylmethyldichlorosilane was prepared in a similar manner as that for preparing the compound 1-pentynylmethyldichlorosilane described in Example 1 with the exception that instead of employing 50 grams of 1-pentyne, 50 grams of 1-hexyne were used. The 1-hexynyl magnesium bromide was then caused to react in the same manner as described in Example 1 with methyltrichlorosilane, the reaction product fractionally distilled to give a colorless liquid in a 55.5% yield boiling at 187–188° C. at atmospheric pressure. This compound was identified as being 1-hexynylmethyldichlorosilane as evidenced by the analysis for silicon which showed it to contain 13.91% as compared to the theoretical value of silicon of 14.36%.

In addition to the compound 1-hexynylmethyldichlorosilane, there was also obtained a smaller amount of a product distilling at 148–150° C. at 8 mm. This material was found to be bis-(1-hexynyl) methylchlorosilane having the formula

[CH$_3$—(CH$_2$)$_3$—C≡C]$_2$Si(CH$_3$)Cl

Silicon analysis conducted on the latter composition showed it to contain 12.4% silicon as compared to the theoretical value of 11.7% silicon.

Example 3

The compound 1-pentynylphenyldichlorosilane or 1-hexynylphenyldichlorosilane may be prepared in the same manner as that employed in preparing the compounds described in Examples 1 and 2 with the exception that instead of using methyltrichlorosilane, phenyltrichlorosilane is used to react with the organoethynyl magnesium halide. The compound 1-pentynylphenyldichlorosilane has the formula

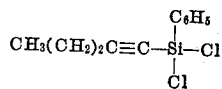

and the compound 1-hexynylphenyldichlorosilane has the formula

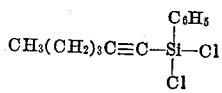

Obviously, other organoethynyldihalogenoorganosilanes of the formula

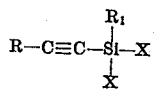

where R and $R_1$ have the meaning given above and X is a halogen, may be prepared by varying the type of organotrihalogenosilanes employed and the kind of organoethynyl magnesium halide used. Among such compounds may be mentioned 1-pentynylmethyldibromosilane, phenylethynylpropyldichlorosilane, benzylethynyldibromosilane, having the formula

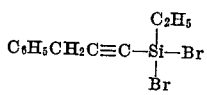

(from benzylethynyl magnesium bromide and ethyltribromosilane), 1-hexynylbenzyldichlorosilane (from 1-hexynyl magnesium bromide and benzyltrichlorosilane), etc. Other compositions which may be prepared in accordance with the description in the present invention are clearly evident from the preceding description and will vary, of course, depending on the type of organoethynyl magnesium halide used and the type of organotrihalogenosilane employed in the reaction.

The following examples describe the preparation of organoethynyldiacyloxyorganosilanes.

Example 4

The 1-pentynylmethyldichlorosilane prepared in Example 1 was mixed with an equivalent molar amount of acetic anhydride in the presence of a small amount of a solution of triethanolamine in the same acetic anhydride as a catalyst. The reaction mixture was then refluxed for 1½ hours and the low boiling material removed. The residual product was then vacuum-distilled to give a colorless liquid in an 85% yield boiling at about 96–102° C. at 0.3 mm. This material was identified as 1-pentynylmethyldiacetoxysilane because of the found saponification equivalent of 116 which compared favorably with the calculated saponification equivalent of 114.

Example 5

The compound 1-hexynylmethyldiacetoxysilane was prepared in the same way as was done in preparing the compound 1-pentynylmethyldiacetoxysilane with the exception that instead of using an equivalent amount of the 1-pentynylmethyldichlorosilane, an equivalent amount of 1-hexynylmethyldichlorosilane was used with acetic anhydride. The reaction was carried out in the same way as described in Example 4 and the residual reaction product fractionally distilled to give in an 83% yield a colorless liquid boiling at 102–106° C. at 0.3 mm. The material was identified as 1-hexynylmethyldiacetoxysilane by virtue of the fact that a saponification equivalent test conducted on the composition showed it to be 124 as compared to the theoretical saponification equivalent of 121.

It will be apparent to persons skilled in the art that other organoethynyldiacyloxyorganosilanes may be prepared depending on the type of organoethynyldihalogenoorganosilane employed and the type of acid anhydride used. Such variations may be accomplished by using many of the different organoethynyldihalogenoorganosilanes described above with other acid anhydrides as, for example, propionic acid anhydride, butyric acid anhydride, etc. Thus, for example, 1-pentynylphenyldichlorosilane described in Example 3 can be reacted with propionic acid anhydride to give 1-pentynylphenyldipropionoxysilane having the formula

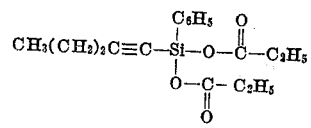

The following examples illustrate the preparation of some organoethynyldialkoxyorganosilanes.

Example 6

The compound 1-pentynylmethyldiethoxysilane may be prepared by effecting reaction in the presence of pyridine as a hydrohalide acceptor between 1-pentynylmethyldichlorosilane and ethyl alcohol. Preferably the molar ratio of ingredients is at least 1 to 2 and may be of the order of from 2 to 4 mols of the alcohol per mol of silane. The compound, 1-pentynylmethyldiethoxysilane, has the formula

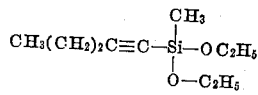

Example 7

The compound 1-hexynylmethyldipropoxysilane may be prepared similarly as in Example 6 by effecting reaction between one equivalent of 1-hexynylmethyldichlorosilane and at least two equivalents of, for example, 2 to 4 equivalents, of propyl alcohol (or isopropyl alcohol, if desired), and isolate the desired composition which has the formula

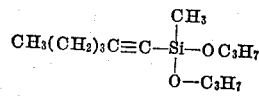

Example 8

The 1-pentynylmethyldiacetoxysilane prepared in Example 4 was hydrolyzed with water by adding it slowly to a saturated salt solution with constant stirring, the water present in the aforesaid solution being in an amount in excess of that required to effect complete hydrolysis of the silicon-bonded acetoxy radicals. Thereafter, two layers formed and the lower organic layer was removed and the product dried over anhydrous calcium sulfate. The material was then centrifuged to remove any residual particles to give a clear colorless liquid. There was thus obtained the compound bis-(1-pentynylmethyl) disiloxanediol having the formula

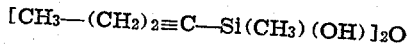

The identity of this material was established by analyses for silicon and molecular weight. This compound was found to contain 20.68 percent silicon (theoretical 20.74 percent) and to have a molecular weight of 261 (theoretical molecular weight 270).

Example 9

The 1-hexynylmethyldiacetoxysilane prepared in Example 5 was hydrolyzed in the same manner as that described in Example 8 and thereafter treated to obtain a colorless slightly viscous oil. The hydrolysis product during distillation apparently had gone from the bis-(1-hexynylmethyl)disiloxanediol having the formula

[CH₃—(CH₂)₃—C≡C—Si(CH₃)(OH)]₂O to a condensed cyclic derivative having the formula

[CH₃—(CH₂)₃—C≡C—Si(CH₃)O]₄

Analysis of the diol product showed it to contain 18.74 percent silicon (theoretical 18.79 percent). The condensed cyclic derivative described above boiled at around 167° C. at 0.5 mm. and analysis showed it to have a molecular weight of about 583 as compared to the theoretical molecular weight of 560 thus identifying the material as the cyclic derivative.

The diol and cyclic tetrasiloxane described in Example 9 were prepared depending on the rate of hydrolysis and whether condensation catalysts were employed. By observing careful conditions, that is, by using slow addition of the silicon derivative to the water and maintaining the hydrolysis at a temperature well below room temperature, for example, at 0° C., the diols can be obtained. At higher temperatures or using more rapid addition of the hydrolyzable ethynyl silane, more rapid condensation of the silicon-bonded hydroxyl groups is effected to form the siloxane linkages.

Obviously, other organoethynyldialkoxyorganosilanes may be prepared in addition to those described above. The type of organoethynyldialkoxyorganosilanes obtained will depend on the type of organoethynyldichlorosilane used and the particular lower saturated aliphatic alcohol employed. From the description found above, various examples of organoethynyldihalogenosilanes and various alcohols may be used in order to give different combinations of ingredients so as to produce in the final compounds in which the organic groups are varied and the alkoxy groups are also varied.

The acetylenic silicon derivatives herein disclosed and claimed are useful as starting materials for making various polymeric compositions. Thus, these compositions may be polymerized with various polymerization catalysts, for example, benzoyl peroxide, to make polymers having utility as insulating or dielectric media. In addition derivatives from these materials may be made by a reaction of the acetylenic silicon compositions with various reactive materials capable of adding across the acetylenic triple bond. Thus, the compositions may be hydrogenated to give olefinic or paraffinic derivatives, depending on the degree of hydrogenation, keeping in mind that adequate precautions should be taken to prevent hydrolysis of the hydrolyzable groups. In addition, hydrogen halides may also be added across the triple bond to completely saturate the latter bond or to add only one molecule of hydrogen halide. The introduction of hydrogen halide adds an additional functional group, namely, a halogen atom, to the compound. Moreover, halogenation of the acetylenic silicon compositions may be carried out by subjecting the above-described material to reaction with a halogen, for example, chlorine, fluorine, etc., wherein part or all of the unsatisfied valence bonds of the triple bond may be saturated with halogens.

Other silicon compositions, particularly silicon compositions containing a silicon-bonded hydrogen and a silicon-bonded halogen, for example, silicochloroform and methyldichlorosilane, may be added across the triple bond to give additional silicon substitution. Finally, such materials as H₂S, mercaptans, HCN, organic nitriles, etc., may also be added to make new derivatives.

An important use to which these hydrolyzable compositions may be used is that in which the above-described materials are subjected to hydrolytic conditions with water whereby siloxane linkages are obtained. It is apparent from the examination of Formula I that the materials embraced by such formula are difunctional as far as hydrolysis is concerned. Thus, if one should hydrolyze a compound, for example, such as 1-pentynylmethyldichlorosilane, one would obtain a diorganosiloxane having the recurring structural unit of the formula

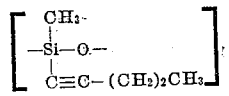

which can be used in many applications as presently known silicone oils are used, e. g., as lubricants, as mold-release agents, for water-repellency purposes, etc. Such compositions, because of the acetylenic unsaturation provide diorganosiloxanes which have additional functionality due to the presence of the triple bond and thus can be used for polymerization purposes after the siloxane is formed or for modification by treatment with compositions which will add across the triple bond. Obviously, other diorganosiloxanes in which each silicon atom contains an organoethynyl group bonded thereto may also be prepared using the many organoethynyl hydrolyzable organosilanes described above. The diorganosiloxanes possible by the hydrolysis of the compositions herein disclosed and claimed may be equilibrated with hexaorganodisiloxanes to give chain-stopped linear polysiloxanes containing a recurring structural unit of which the unit

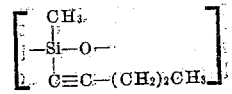

is a representative one. In addition, the diorganosiloxanes possible by hydrolyzing the herein-described compositions may also be condensed to higher molecular weight products which can be used in the preparation of silicone rubbers.

If desired, the above-described acetylenic silicon compositions may also be copolymerized with various materials including styrene, butadiene, vinyl chloride, vinyl acetate, various acrylates and methacrylates, acrylonitrile, etc., to form new and useful polymeric materials. Such co-reaction products then have increased functionality due not only to the presence of the triple bond or double bond, in the case of addition compounds, but also due to the fact that hydrolysis of the materials will give two points of additional functionality. Such a reactive material may be important in connection with silicone polymers in order to obtain a faster cure for silicone rubbers or quicker drying times for silicone varnishes.

What we claim as new and desire to secure by Letters Patent of the United States is:

1. A composition corresponding to the general formula $$R-C\equiv C-\underset{X}{\overset{R_1}{Si}}-X$$

where R and $R_1$ are monovalent hydrocarbon radicals selected from the class consisting of alkyl, phenyl, diphenyl, naphthyl, alkaryl, and aralkyl radicals, and X is a hydrolyzable group selected from the class consisting of halogens, acyloxy and alkoxy groups.

2. 1-pentynylmethyldichlorosilane.
3. 1-hexynylmethyldichlorosilane.
4. 1-pentynlmethyldiacetoxysilane.
5. 1-hexynylmethyldiacetoxysilane.
6. 1-pentynylmethyldiethoxysilane.
7. The process for making an organoethynyl hydrolyzable organosilane which comprises reacting a compound having the formula $$R-C\equiv C-MgBr$$

with a compound having the formula $$R_1Si(X)_3$$

where R and $R_1$ are monovalent hydrocarbon radicals selected from the class consisting of alkyl, phenyl, diphenyl, naphthyl, alkaryl, and aralkyl radicals, and X is a halogen.

8. The process which comprises reacting 1-pentynyl magnesium bromide with methyltrichlorosilane thereby to produce 1-pentynylmethyldichlorosilane.

9. The process which comprises reacting 1-hexynyl magnesium bromide with methyltricholorosilane thereby to produce 1-hexynylmethyldicholorosilane.

KURT C. FRISCH.
ROBERT B. YOUNG.

References Cited in the file of this patent

UNITED STATES PATENTS

| Number | Name | Date |
|---|---|---|
| 2,082,569 | Carothers | June 1, 1947 |
| 2,551,924 | Boldebuck | May 8, 1951 |

OTHER REFERENCES

Volnov et al., "Jour. Gen. Chem." (USSR) (1940), vol. 10, pp. 1600–4.

Rochow, "Chemistry of the Silicones" (1946), page 14, Wiley and Son, publishers, New York, N. Y.